US010610331B2

(12) United States Patent
Melikyan et al.

(10) Patent No.: US 10,610,331 B2
(45) Date of Patent: Apr. 7, 2020

(54) INDIRECT ATRAUMATIC METHOD FOR RESTORING TEETH DECAYED/FRACTURED BELOW THE GUM LINE

(71) Applicants: Melikset Litvinovich Melikyan, Glendale, CA (US); Karine Meliksetovna Melikyan, Glendale, CA (US)

(72) Inventors: Melikset Litvinovich Melikyan, Glendale, CA (US); Karine Meliksetovna Melikyan, Glendale, CA (US); Garegin Meliksetovich Melikyan, Moscow (RU)

(*) Notice: Subject to any disclaimer, the term of this patent is extended or adjusted under 35 U.S.C. 154(b) by 0 days.

(21) Appl. No.: 15/115,716

(22) PCT Filed: Mar. 4, 2015

(86) PCT No.: PCT/RU2015/000135
§ 371 (c)(1),
(2) Date: Apr. 30, 2018

(87) PCT Pub. No.: WO2015/137848
PCT Pub. Date: Sep. 17, 2015

(65) Prior Publication Data
US 2017/0007358 A1    Jan. 12, 2017

(30) Foreign Application Priority Data
Mar. 13, 2014    (RU) ................................ 2014109673

(51) Int. Cl.
*A61C 13/30* (2006.01)
*A61C 5/35* (2017.01)
*A61C 5/70* (2017.01)
*A61C 5/77* (2017.01)
*A61C 5/50* (2017.01)

(52) U.S. Cl.
CPC .................. *A61C 5/77* (2017.02); *A61C 5/35* (2017.02); *A61C 5/50* (2017.02); *A61C 5/70* (2017.02); *A61C 13/30* (2013.01)

(58) Field of Classification Search
CPC .. A61C 13/30; A61C 5/70; A61C 5/50; A61C 5/35; A61C 5/68; A61C 5/64; A61C 5/77; A61C 5/73
USPC .................. 433/211, 220, 223, 224, 226, 225
See application file for complete search history.

(56) References Cited

U.S. PATENT DOCUMENTS

| | | | | | |
|---|---|---|---|---|---|
| 4,253,835 | A | * | 3/1981 | Ware | A61C 13/30 264/16 |
| 4,622,012 | A | * | 11/1986 | Smoler | A61C 13/30 433/221 |
| 4,828,495 | A | * | 5/1989 | Bell | A61C 13/0003 433/200.1 |
| 4,846,718 | A | * | 7/1989 | Rieger | A61C 13/0003 433/180 |
| 5,074,792 | A | * | 12/1991 | Bernadat | A61C 13/30 433/220 |
| 5,314,335 | A | * | 5/1994 | Fung | A61C 5/00 433/223 |
| 5,487,664 | A | * | 1/1996 | Weissman | A61C 13/30 433/220 |
| 5,564,929 | A | | 10/1996 | Alpert | |
| 5,816,816 | A | * | 10/1998 | Scharf | A61C 13/30 433/220 |
| 5,839,900 | A | * | 11/1998 | Billet | A61C 13/0003 433/218 |
| 5,919,044 | A | * | 7/1999 | Sicurelli, Jr. | A61C 13/30 433/220 |
| 5,964,592 | A | * | 10/1999 | Hites | A61C 13/30 433/221 |
| 5,989,032 | A | * | 11/1999 | Reynaud | A61C 13/30 433/220 |
| 6,183,253 | B1 | * | 2/2001 | Billet | A61C 13/30 433/224 |
| 6,386,865 | B1 | * | 5/2002 | Suh | A61C 13/0003 264/16 |
| 6,595,776 | B2 | * | 7/2003 | Kangasniemi | B05C 17/00593 433/224 |
| 6,638,069 | B2 | * | 10/2003 | Hagenbuch | A61C 13/30 264/16 |

(Continued)

FOREIGN PATENT DOCUMENTS

EP    0565889    10/1993
GB    2162068    7/1985

(Continued)

OTHER PUBLICATIONS

ProQuest Machine English Translation of RU 2252729, 2005 (Year: 2005).*

(Continued)

*Primary Examiner* — Matthew F Desanto

(57) ABSTRACT

The invention relates to the field of dentistry and is intended for restoration/reconstruction of teeth decayed/fractured below the gum line using reinforcement technology of composite materials. The indirect atraumatic method for restoration/reconstruction of teeth decayed/fractured below the gum line comprises using a metal mesh-reinforced composite (MMC) dental prosthesis according to M. L. Melikyan, which is made by a laboratory method using gypsum models. The metal mesh-reinforced composite (MMC) dental prosthesis is comprised of a flexible crown-root wire pin and reinforcing crown-root frame assembly made from a mesh and free mesh wires. The walls of the crown part of the dental prosthesis are formed from a composite material. The proposed technology makes it possible to allow for the residual effects of polymerization shrinkage of the composite material during production of the metal mesh-reinforced composite (MMC) dental prosthesis and to ensure the quality of grinding and polishing of the crown part of the prosthesis, and, consequently, to increase the stability and durability of the restoration/reconstruction of the restored tooth.

1 Claim, No Drawings

(56) References Cited

U.S. PATENT DOCUMENTS

| | | | |
|---|---|---|---|
| 7,235,290 B2* | 6/2007 | Vallittu | A61K 6/08 |
| | | | 428/296.7 |
| 8,382,478 B2* | 2/2013 | White | A61C 13/00 |
| | | | 433/213 |
| 8,414,297 B2* | 4/2013 | Calvert | A61C 5/50 |
| | | | 433/224 |
| 2011/0123959 A1* | 5/2011 | Sicurelli | A61C 13/30 |
| | | | 433/221 |
| 2013/0158694 A1* | 6/2013 | Rubbert | A61C 8/0018 |
| | | | 700/98 |
| 2015/0099238 A1* | 4/2015 | Chesler | A61C 13/30 |
| | | | 433/165 |

FOREIGN PATENT DOCUMENTS

| | | |
|---|---|---|
| RU | 2233641 | 8/2004 |
| RU | 2238698 | 8/2004 |
| RU | 2240076 | 11/2004 |
| RU | 2252729 * | 5/2005 |
| RU | 2253401 | 6/2005 |
| RU | 2253402 | 6/2005 |
| RU | 2262904 | 10/2005 |
| RU | 2276594 | 12/2005 |
| RU | 2282418 | 8/2006 |
| RU | 2299040 | 5/2007 |
| RU | 2548798 | 3/2015 |

OTHER PUBLICATIONS

A.B. Borisenko, V.P. Nespryadko "Composite Filling and Facing Materials." Kiev, Kniga Plus, 2001, pp. 21,22 last pharagraf.

S.K. Surzhansky et al., "Restoration Materials and Foundations of Practical Endodology." Kiev, Kniga Plus, 2004, p. 28).

* cited by examiner

INDIRECT ATRAUMATIC METHOD FOR RESTORING TEETH DECAYED/FRACTURED BELOW THE GUM LINE

This application is the United States National stage application of International Application PCT/RU2015/000135 filed on Apr. 3, 2015, which claims the benefit of Russian Patent application No RU 2014109673 Filed on Mar. 13, 2014, the entire disclosure of which is incorporated herein by reference.

The invention relates to the field of dentistry, namely to methods of restoration/reconstruction of teeth decayed/fractured below the gum line using reinforcement technology of composite materials. Currently, the methods of restoration/reconstruction according to M. L. Melikyan, which are based on the reinforcement of composite materials, are increasingly more relevant in dental practice. Experimental studies of the properties of the reinforced composite material have enabled the expansion of the scope of its application in clinical situations that are traditionally covered by artificial crowns or bridge prosthetics.

The known methods for restoring the coronal part of teeth, which were developed by M. L. Melikyan in collaboration with G. M. Melikyan and K. M. Melikyan, are grouped under direct restorations/reconstructions of the coronal portion of teeth, which are implemented directly in the patient's mouth. The essence of these techniques is to simulate the missing coronal section of the tooth with the use of a composite material and a gold-plated metal reinforcement mesh (for example, one manufactured by "Dentaurum"). Patents for inventions No. 2262904, No. 2276594, No. 2233641, No. 2282418, No. 2238698, No. 2253402, No. 2252729, et al. cover a variety of clinical situations.

In particular, the patent for invention No. 2299040 describes the method of direct restoration of lateral teeth in case of a complete destruction of the coronal portion with the use of composite material and reinforcing dental mesh. The dental mesh is used to form a reinforcing crown-amortizing frame assembly, which is retained against the root of the tool by means of a reinforcing wire-adhesive pin with an apical end made of wires with the thickness of 0.6 mm that are curved in half. The root of the wire-adhesive pin is inserted into the root canal cavity through the perforation of the frame assembly and is retained with the use of glass-ionomer cement while the top part of the pin, which is in the form of ongoing wires of its intracanal part, is distributed and retained on the surface of the crown-amortizing frame assembly below the gum line with subsequent filling of the frame cavity with glass-ionomer cement to the gum line. The coronal section of the tooth from the gum line to the cusp line is made with the use of microfill composite materials while the cusps are restored with the use of macrofill composite materials.

The monolithic reinforced composite coronal section of the tooth that has been restored with the use of the known method and is retained against the root of the tooth with a pin can withstand a prolonged mastication load owing to the increased stability due to the design features of the wire-adhesive pin and its retention method as well as exhibits an increased strength due to the root canal reinforcement effect and to the composite material of the coronal section of the tooth.

Benefits of a restoration of lateral teeth with the use of the known method:
  the intracanal part of the pin provides for canal reinforcement;
  the weaving of the wires of the intracanal part of the pin and the passive retention of the pin prevents the occurrence of stress in the root canal and so eliminate root fracturing under the impact of functional loading;
  the penetration of the glass-ionomer cement between pin wire weaving provides for a through the connection between the cement and the root walls;
  the top wire part of the pin provides for an additional mechanical retention of the reinforcing crown-amortizing frame assembly and the root base and ensures a secure fixing of the restored coronal section of the tooth to the roots of the teeth;
  the top wire part of the pin provides for dual reinforcement of the area of the root base up to the gum line;
  the top wire part of the pin is located at the gum line or below inside the amortizing cavity of the root base, which provides for restoration of the coronal section of the tooth in total compliance with its anatomical structure.

The disadvantage of composite restoration/reconstruction is the polymerization shrinkage of the composite material, which reaches 2-5 pet of the volume. This shrinkage is due to the reduction of the distance between monomer molecules in the course of a polymeric chain creation. Hardening of the composite material (under the influence of light or as the result of a chemical reaction) leads to condensation of monomer molecules, which creates a polymeric chain. The polymerization rate of the composite material depends on a number of factors: it is largely dependent on the amount of the initiator, the temperature, and the illumination time and intensity. It is also dependent on the color and the transparency of the composite material (A. B. Borisenko, V. P. Nespryadko "Composite Filling and Facing Materials" Kiev, Kniga Plus, 2001, pp. 17-21). In this case, the studies of physical and chemical properties of the composite material demonstrate that, if shrinkage of the composite material is accepted at 100 pet, the material shrinks by 60 pet of its initial volume in the first minute, by another 15 pet after 5 minutes, and by the remaining 25 pet during the first day (S. K. Surzhansky et al., "Restoration Materials and Foundations of Practical Endodology" Kiev, Kniga Plus, 2004, p. 28).

In the practical dentistry, the residual effects of polymerization shrinkage of composite materials can lead to fragmentation of the dentition in case of direct restoration/reconstruction of the missing coronal section of the tooth. This may lead to the creation of a gap between the approximal surfaces of the restored composite tooth and adjacent approximal surfaces of adjacent natural teeth. The dentition dissociation has a negative impact on the stability and the strength of the restored composite tooth under the influence of mastication loads. Reinforcement of composite materials in case of direct restoration/reconstruction somewhat reduces the risk of occurrence of residual symptoms of polymerization shrinkage but does not eliminate it completely. Residual polymerization shrinkage adversely affects the aesthetic appeal of the restored composite tooth. In case of implementation of known techniques of restoration/reconstruction of missing coronal sections of a tooth with the use of composite materials, grinding and polishing of the composite structure are implemented in the final stage of the restoration/reconstruction. Removal of the roughness on the surface of restoration/reconstruction is aimed at reducing the absorbent properties of the composite material. Penetration (retention) of food-grade dyes or water reaches a depth from 3 to 5 microns. The presence of residual effects of polymerization shrinkage and inaccessible areas for high-quality polishing and grinding over the entire surface of the restored composite tooth in case of direct restoration/reconstructions can lead to changes in the color of the surface layer of the restoration and to its increased abrasion.

The claimed invention is directed at the prevention of risks that are caused by the polymerization properties of the composite material and by the difficulty of direct restoration directly in the patient's oral cavity.

The claimed invention solves the problem of excluding the impact of the residual effects of polymerization shrinkage of composite materials and also reduces the degree of retention of food-grade dyes and water through the use of metal mesh-reinforced composite (MMC) dental prosthesis.

The technical result, which is manifested in ensuring the stability and the strength of the restored composite tooth as well as in the improvement of the quality of polishing and grinding of the restoration surface, is provided by the features of manufacturing of metal mesh-reinforced composite (MMC) dental prosthesis and the method of retention of the prosthesis in the root of the tooth.

The claimed indirect method for restoration/reconstruction of teeth decayed/fractured below the gum line with the use of metal mesh-reinforced composite (MMC) dental prosthesis according to M. L. Melikyan provides for a number of advantages that distinguish this method from the known direct restorations/reconstructions of the coronal section of the tooth with the use of reinforcing composite materials and from the conventional prosthetics methods with the use of pins.

The advantages associated with the increased strength and aesthetic characteristics of the restored tooth are due to the use of a metal mesh-reinforced composite (MMC) dental prosthesis and the features of its manufacture and retention, in particular:

elimination of manifestations of residual polymerization shrinkage of the composite material as well as improvement of the quality of polishing and grinding of the composite enamel layer across the entire surface of the reconstructed coronal section of the tooth;

the use of vibration impact in order to ensure penetration of the fixing cement via the through cells of the root-and-coronal section of the frame assembly and compaction of the cement in order to ensure a secure fixing of the prosthesis on the preserved part of the root of the natural tooth;

an increase in the accuracy of simulation of the approximal surface of the coronal section of the tooth that is inaccessible in case of direct restoration/reconstruction with the use of composite materials and provision for the unity of the dentition through the high-quality contact between adjacent teeth;

the use of atraumatic means for retention of a dental prosthesis in the form of a flexible coronal-root wire pin.

These advantages are in causal connection with the claimed technical result and have a direct effect on its achievement.

Examples of the indirect method of restoration/reconstruction of the teeth decayed/fractured below the gum line with the use of metal mesh-reinforced composite (MMC) dental prosthesis according to M. L. Melikyan in various clinical situations are presented below.

EXAMPLE 1. IMPLEMENTATION OF THE PROPOSED METHOD IN CASE OF DESTRUCTION OF A SINGLE-ROOT PREMOLAR BELOW THE GUM LINE

I. The Clinical Stage.

The X-ray examination of the tooth being restored and the quality control of endodontic treatment are implemented. The root canal must be filled to ⅓ of the root length and must be free of periapical changes.

The color of the tooth being restored is determined. The color of the tooth being restored must be determined in daylight using the color of adjacent teeth as a basis of comparison. A small amount of paste is applied to the surface of the teeth, and cleaning is implemented. Next, teeth are thoroughly washed with running water, and the color of the tooth is determined using the VITA standard scale. Then, the odontic preparation process is started. If necessary, gingivectomy can be performed prior to odontic preparation.

Odontic preparation is implemented. The height of the root of the damaged tooth from the gum line to its top is conventionally divided into two equal areas: the top and the bottom.

The top of the root section of the tooth being restored is measured from the gum line to ½ of the root length.

The bottom of the root section of the tooth being restored is measured from the ½ of the root length to the top of the root section.

Firstly, the preparation and the removal of destroyed and demineralized tissues from the top of the root section of the tooth are implemented.

After the preparation, the cavity with a conical incline towards the lower border of the top and with the diameter of the lower border of 1.5-2 mm is formed. In the bottom, the root canal is formed into a cylindrical shape, which stops at 3-4 mm away from the filled apical part of the root.

As a result of the preparation, a truncated conical cavity is formed in the root of the tooth, which is turned into a cylindrical cavity in the bottom of the root section.

After the preparation, the restoration/reconstruction of the ruined root and precervical walls of the coronal section of the tooth are implemented.

Restoration/reconstruction of the ruined root and precervical walls of the coronal section of the tooth includes the restoration/reconstruction of the ruined walls of the root of the tooth to the gum line; the restoration/reconstruction of the ruined precervical walls of the coronal section of the tooth to the height of 2-3 mm above the gum line; the final restoration/reconstruction of root and precervical walls of the tooth being restored; and grinding and polishing of restored root and precervical walls of the tooth being restored.

After the preparation, acid etching and adhesive treatment of the surviving walls of the root section of the tooth are performed according to the instructions, and then the restoration/reconstruction of the ruined walls of the root section of the tooth to the gum line is implemented.

Operation 1. Restoration/Reconstruction of the Ruined Wall of the Root of the Tooth to the Gum Line.

Restoration/reconstruction of the ruined walls of the root of the tooth is implemented with the use of a microhybrid composite material. The portion of the composite material, which has been preliminarily subjected to the method of manual mechanical activation (MMA) of the composite material according to M. L. Melikyan is used to form a roll, which is placed on the inner surface of the root wall at a distance of 2-3 mm from its edge. With the help of a plastic instrument, the composite roll is evenly distributed onto the entire inner surface of the root wall and onto its preserved edge to form a thin layer. Polymerization is then performed. With the use of several composite rolls, the restoration/reconstruction of the walls of the root of the tooth to the gum line is implemented until a wall with a thickness of 1.5-2 mm is formed.

Then, the restoration/reconstruction of the ruined precervical walls of the coronal section of the tooth is implemented.

Operation 2. Restoration/Reconstruction of the Ruined Precervical Walls of the Coronal Section of the Tooth.

Restoration/reconstruction of the precervical wall of the coronal section of the tooth is performed with the use of rolls made of a composite material such as rolls used in stage 1. The free ends of the rolls are connected to each other to form a composite ring. With the help of 2-3 composite rings, which are placed one by one onto the face of the restored root section of the tooth, precervical walls of the coronal section of the tooth are restored to the height of 2 to 3 mm above the gum line. Composite rolls are also used to model the outer and the inner surfaces of the precervical walls; in this case, the rolls are placed in the contact area of adjacent composite rings and are uniformly distributed with the use of a plastic instrument while leveling the wall surfaces. Polymerization of the restored precervical walls is then implemented.

Operation 3. Grinding and Polishing of Restored Root and Precervical Walls of the Tooth being Restored Grinding of the inner surface of root and precervical walls of the tooth being restored as well as grinding and polishing of the outer surface of the precervical wall of the coronal section of the tooth must be implemented according to the instructions. After grinding and polishing, the thickness of restored precervical walls of the coronal section of the tooth must not exceed 1.5-2 mm and the height above the gum line must not exceed 2-3 mm.

I. The Laboratory Stage.

Impressions of the upper and the lower jaws, as well as the occlusion rim (bite block), are made. The quality of display of the tooth being restored and the quality of display of occlusal contacts are assessed. After making the impressions, the tooth being restored must be covered with a temporary filling.

II. The Laboratory Stage.

The obtained casts are used to manufacture the main and the auxiliary models made of die stone. Then, the models are correlated with the use of a bite block in an occluder or in an articulator. The main model must be coated with an insulating varnish; then, the metal mesh-reinforced composite (MMC) dental prosthesis is manufactured. For the manufacture of the metal mesh-reinforced composite (MMC) dental prosthesis, the "Dentaurum" gold-plated metal mesh with a thickness of 0.4 mm, the mesh size of 0.4×0.4 mm, and the wire diameter of 0.2 mm is used.

The process of manufacturing of the metal mesh-reinforced composite dental prosthesis consists of the following steps:
  manufacture of a flexible crown-root wire pin;
  manufacture of a mesh crown-root frame assembly;
  manufacture of a metal mesh-reinforced composite (MMC) dental prosthesis.

Operation 1. Manufacture of a Flexible Crown-Root Wire Pin.

Several wires are extracted from the gold-plated metal mesh weaving. The wire length must correspond to the length of the root and the coronal sections of the tooth being restored. The wire is conventionally divided into two equal parts: the root and the coronal parts. The wire of the root section must be mechanically twisted together so as to create an apical portion of the wire pin, the length of which must correspond to the length of the cylindrical cavity, which has been formed in the lower portion of the root canal, and the diameter of the apical portion of the pin must correspond to the diameter of this cavity. The number of wires varies depending on the diameter of the root canal.

The fitting and the adjustment of the flexible crown-root wire pin with the use of the gypsum model are performed. The pin must be inserted inside the cylindrical cavity of the lower part of the root canal in the gypsum model without additional force. The length of the pin must exceed the height of the equator of the coronal part of the tooth being restored by 2-3 mm. Due to the absence of reversible deformation, the apical part of the pin must correspond to the form of the root canal.

After fitting and adjustment, the pin is removed from the gypsum model, and the process of manufacturing of the reinforcing mesh crown-root frame assembly is performed.

Operation 2. Manufacture of a Reinforcing Mesh Crown-Root Frame Assembly.

The metal mesh with the length and the width of 2.5-3 cm is mechanically shaped into a cup. The mesh retains its new shape without returning to the original one due to permanent deformation. After bending, the shape of cells of the mesh changes while preserving the sequential cellularity (porosity), which allows achieving through penetration of the composite material and fixing material (cement) throughout the through cells in the course of the subsequent restoration process. The cup-shaped mesh preform is conventionally divided into two parts: the root and the coronal parts.

The mesh preform is then installed into the truncated conical cavity of the gypsum model and is mechanically forced into the cavity whose shape matches the precervical-root conical cavity, which is formed in the top of the root section of the tooth being restored. This forms the root part of the frame assembly with a mating lateral surface in the shape of a truncated cone and with the bottom section that faces towards the apical section of the root. When creating the coronal section of the reinforcing coronal-root mesh frame assembly of the wall of the coronal section, the preforms are brought together so as to extend from the contact surfaces of adjacent teeth on the gypsum model by 2 mm. In this case, the height of the coronal section of the frame assembly must be 2 mm below the occlusal surface of the tooth being restored. The fitting and the adjustment of the reinforcing mesh crown-root frame assembly are then implemented with the use of a gypsum model.

Operation 3. Manufacture of a Metal Mesh-Reinforced Composite (MMC) Dental Prosthesis.

The reinforcing crown-root frame assembly is removed from the gypsum model. At the bottom of the root section of the frame assembly, wires are mechanically separated in the cylindrical cavity projection and a through hole is formed with a diameter corresponding to the diameter of the twisted section of the flexible wire pin. Next, the reinforcing mesh crown-root frame assembly is installed into the gypsum model, and the fitting and the adjustment of the flexible wire pin is implemented. The twisted section of the wire pin is installed into the cylindrical cavity through the formed through a hole in the bottom section of the frame assembly. Above the level of the hole, straight wires are radially separated from each other and mechanically pressed against the surface of inner walls of the frame assembly. Thus, the free flexible wires of the pin conform to the shape of the inner surface of the walls of the frame assembly. The wire length must such as to reach the level of the equator of the coronal section of the tooth. The fitting and the adjustment of the pin in conjunction with the frame assembly are implemented, after which the wire pin and the reinforcing mesh crown-root frame assembly are removed from the gypsum model.

The reinforcing mesh crown-root frame assembly is degreased and installed onto the gypsum model. The twisted section of the flexible wire pin is passed through the hole that has been formed in the bottom section of the frame assembly and installed in the cylindrical cavity of the bottom section of the root canal on the gypsum model. Free wires of the coronal section of the pin are pressed against the inner surface of the coronal section of the frame assembly. Free ends of the wires at the equator are retained against the inner surface of the frame assembly with the use of the composite material. Polymerization is then performed.

After the retention of the flexible wire pin, a horizontal composite partitioning, which is anchored inside the frame assembly at the level of the equator, is formed. The microhybrid composite material is shaped into a roll with a thickness of 2 mm using the method of manual mechanical activation (MMA) according to M. L. Melikyan. Free ends of the roll are pressed against the inner surface of the coronal section of the frame assembly at the level of the equator. Polymerization is then performed. With the use of several composite rolls, a horizontal composite partition is created, which divides the interior cavity of the frame assembly into two parts (the bottom, which extends from the level of the equator to the gum line, and the top, which extends from the level of the equator to the occlusal surface level).

Then, the restoration/reconstruction of the composite walls of the coronal section of the dental prosthesis is implemented.

The microhybrid composite material is shaped into a roll with the thickness of 2-3 mm and is installed onto the edge of the precervical wall on the gypsum model. The composite roll is then mechanically pressed simultaneously against the edge and against the outer surface of the coronal section of the frame assembly. As a result, the composite roll conforms to the shape of the edge of the restored precervical wall and partially penetrates into the coronal section of the frame assembly through the mesh cells. Polymerization is then performed.

With the use of alternately placed rolls, composite walls (a reinforcing artificial enamel layer with a thickness of 2-2.5 mm) are formed along the height of the coronal section of the dental prosthesis: i.e. the height of the precervical edge up to the level of the occlusal surface.

Then, the final restoration/reconstruction of the coronal section of the dental prosthesis is implemented.

The walls of the coronal part of the dental prosthesis form an open artificial cavity (type I cavity according to Black's classification), which is filled with the composite material (an artificial dentin layer) by layers, above the equator level. After the application of each subsequent layer of the composite material, the polymerization process is performed. Then, cusps are restored with the use of the microhybrid composite material and occlusal adjustment is implemented.

The ready metal mesh-reinforced composite (MMC) dental prosthesis is removed from the gypsum model, and then grinding and polishing of the composite surface of the coronal part of the dental prosthesis are performed according to the instructions after the residual polymerization shrinkage completion.

II. The Clinical Stage.

During this clinical stage, the metal mesh-reinforced composite (MMC) dental prosthesis is retained in the patient's mouth cavity. For this purpose, the temporary filling must be removed from the cavity of the tooth being restored, and the cavity must be thoroughly washed. The metal mesh-reinforced composite (MMC) dental prosthesis of the tooth being restored is fitted and, if necessary, adjusted. Then, the metal mesh-reinforced composite (MMC) dental prosthesis is degreased. In order to retain the dental prosthesis, the root cavity of the tooth being restored is filled with cement, after which the cement is applied to the mesh section of the dental prosthesis. A vibratory table is used to provide for through penetration of the cement through the mesh cells and for compaction of the cement.

The metal mesh-reinforced composite (MMC) dental prosthesis is installed on the vibratory table with the occlusal surface facing down. The cement is applied in small portions to the mesh root section of the prosthesis that is not covered with the composite material. A vibration of the operating vibratory table causes the cement to penetrate through mesh cells and then into the inner cavity of the reinforcing coronal-root frame assembly, which is limited by the composite partition at the level of the equator of the coronal section. Cement is also applied to the twisted part of the flexible wire pin.

The metal mesh-reinforced composite (MMC) dental prosthesis is coated with cement and placed into the canal of the tooth being restored and retention is implemented. After the retention the excess cement is removed. A thin layer of the composite material is applied to the connection area between the restored precervical walls of the tooth being restored and the metal mesh-reinforced composite (MMC) dental prosthesis in order to ensure tightness of the connection and the high aesthetic property of the restoration. After occlusal correction, the final grinding and polishing of the restored/reconstructed tooth are implemented.

EXAMPLE 2. IMPLEMENTATION OF THE PROPOSED METHOD IN CASE OF DESTRUCTION OF A MULTI-ROOT TOOTH BELOW THE GUM LINE

Implementation of the proposed method in this clinical situation is governed by the anatomical features of the decayed tooth that are associated with the presence of several root canals.

In case of a multi-rooted tooth, the stages and the operations of the method for the restoration of a single-rooted premolar are implemented in the same sequence. In the clinical phase I, X-ray investigation of the tooth being restored, quality control of the endodontic treatment, determination of the color of the tooth being restored, and odontic preparation are implemented as well as gingivectomy prior to the odontic preparation, if necessary. The consecutive restoration/reconstruction of the ruined walls of the root section of the tooth to the gum line, restoration/reconstruction of the ruined precervical walls of the coronal section of the tooth to the height of 2-3 mm above the gum line, the final restoration/reconstruction of root and precervical walls of the tooth being restored and grinding and polishing of restored root and precervical walls of the tooth being restored are carried out.

In the laboratory stage, the main and the auxiliary gypsum models are made of die stone, which serves as the basis for the manufacture of flexible crown-root wire pins, a mesh coronal-root frame assembly, and a metal mesh-reinforced composite (MMC) dental prosthesis.

In this case, 2 or 3 flexible crown-root wire pins are manufactured depending on the clinical situation. In order to retain the metal mesh-reinforced composite (MMC) dental prosthesis in the root of the tooth being restored, the necessary number of through holes in the canal arrangement projection on gypsum models are mechanically formed in the bottom of the root section of the reinforcing mesh crown-root frame assembly. The diameters of the twisted sections of the flexible wire pins must correspond to the diameters of the cylindrical cavities of the canals. The manufacture of a reinforcing mesh crown-root frame assembly and the manufacture of a metal mesh-reinforced composite (MMC) dental prosthesis and its retention in the canal of the tooth being restored are implemented with the use of the methods described above. A thin layer of the composite material is applied to the connection area between the restored precervical walls of the tooth being restored and the metal mesh-reinforced composite (MMC) dental prosthesis in order to ensure tightness of the connection and the high aesthetic property of the restoration. After occlusal correction, the final grinding and polishing of the restored/reconstructed tooth are implemented.

EXAMPLE 3. IMPLEMENTATION OF THE PROPOSED METHOD IN CASE OF DESTRUCTION OF AN ANTERIOR TOOTH BELOW THE GUM LINE

Implementation of the proposed method in this clinical situation is caused by the anatomical features of the decayed tooth.

I. The Clinical Stage.

At the first clinical stage, the following operations are implemented: X-ray investigation of the tooth being restored, quality control of the endodontic treatment, determination of the color of the tooth, gingivectomy (if necessary), odontic preparation, restoration/reconstruction of the ruined walls of the root of the tooth to the gum line, restoration/reconstruction of the ruined precervical walls of the coronal section of the tooth to the height of 2-3 mm above the gum line, final restoration/reconstruction of root and precervical walls of the tooth being restored, grinding and polishing of the restored root and precervical walls of the tooth being restored with the use of the methods that are similar to those described above for the restoration of a single-rooted premolar decayed/fractured below the gum line.

I. The Laboratory Stage.

Impressions of the upper and the lower jaws, as well as the occlusion rim (bite block), are made. The quality of display of the tooth being restored and the quality of display of occlusal contacts are assessed. After making the impressions, the tooth being restored must be covered with a temporary filling.

II. The Laboratory Stage.

In the course of implementation of this stage, the anatomical features of the anterior tooth being restored are taken into account.

The main and the auxiliary models are cast of die stone. Then, the models are correlated with the use of a bite block in an occluder or in an articulator. The main model is coated with an insulating varnish. For the manufacture of the metal mesh-reinforced composite (MMC) dental prosthesis, the "Dentaurum" gold-plated metal mesh with a thickness of 0.4 mm, the mesh size of 0.4×0.4 mm, and the wire diameter of 0.2 mm is used.

The manufacture of a metal mesh-reinforced composite (MMC) dental prosthesis consists of the following operations: the manufacture of a flexible crown-root wire pin; the manufacture of a mesh crown-root frame assembly; the manufacture of a metal mesh-reinforced composite (MMC) dental prosthesis.

Operation 1. Manufacture of a Flexible Crown-Root Wire Pin.

Several wires are extracted from the gold-plated metal mesh weaving. The length of the wires must be twice the height of the tooth being restored. Wires must be bent in the middle, with the free ends brought closer to each other, which will result in a U-shaped wire. Twisted wires are conventionally divided into two equal parts: the root section (from the free ends to the middle of the U-shaped form) and the coronal section (from the middle of the U-shaped form to its apex). The wires of the root section must be mechanically twisted together so as to create an apical portion of the wire pin, the length of which must correspond to the length of the cylindrical cavity, which has been formed in the lower portion of the root canal, and the diameter of the apical portion of the pin must correspond to the diameter of this cavity. The number of wires varies depending on the diameter of the root canal. The fitting and the adjustment of the flexible crown-root wire pin with the use of the gypsum model are performed. The pin must be placed inside the cylindrical cavity of the lower part of the root canal in the gypsum model without additional force; twisted wires that form the apex of the U-shaped form must stop at the distance of 2-2.5 mm away from the cutting edge. After the fitting and the adjustment, the pin is removed from the gypsum model, and the process of manufacturing of the reinforcing mesh crown-root frame assembly is performed.

Operation 2. Manufacture of a Reinforcing Mesh Crown-Root Frame Assembly.

The metal mesh with the length and the width of 2.5-3 cm is mechanically shaped into a cup. The mesh preform is then installed into the truncated conical cavity on the gypsum model and is mechanically forced into the cavity whose shape matches that of the precervical-root conical cavity, which is formed in the top of the root section of the tooth being restored. As a result, the mesh preform acquires the shape of the frame assembly with a convex bottom and a lateral surface that is congruent to the inner surface of the cavity on the gypsum model, which is formed by a cast of the walls of the top of the root and of the precervical walls of the tooth being restored.

Fitting and adjustment of the height of the mesh reinforcing crown-root frame assembly: the vestibular section of the frame assembly must not be higher than the level of the precervical wall from the vestibular surface; the oral part must be placed on the side of the oral surface of the coronal section of the tooth being restored and must stop at a distance of 2 mm, respectively, from the cutting edge of the antagonists and to the cutting edge of the tooth being restored.

Then, the process of formation of approximal walls of the coronal part of the mesh reinforcing crown-root frame assembly is performed.

In order to form approximal walls of the coronal section of the frame assembly, the parts of the frame assembly with the height from the precervical edge to the cutting edge are bent towards each other at a right angle, which subsequently increases the static-bending strength of the coronal section of the tooth being restored. After the fitting and the adjustment, the width of the formed interproximal walls must constitute 2.5-3 mm in the precervical area, 2 mm in the middle third, and 1-1.5 mm in the cutting-edge area. The distance between the formed approximal walls of the mesh frame assembly and the approximal surfaces of adjacent teeth must constitute 2 mm.

After the fitting and the adjustment, the reinforcing mesh crown-root frame assembly is removed from the gypsum model, and the process of manufacture of a metal mesh-reinforced composite (MMC) dental prosthesis is performed.

Operation 3. Manufacture of a Metal Mesh-Reinforced Composite (MMC) Dental Prosthesis.

At the bottom of the root section of the reinforcing mesh crown-root frame assembly, wires are mechanically separated in the created cylindrical cavity projection of the canal and a hole is formed with a diameter corresponding to the diameter of the twisted apical section of the flexible wire pin. The reinforcing mesh crown-root frame assembly is installed into the gypsum model and the twisted apical section of the wire pin is passed through the hole and placed in the root canal on the gypsum model. Subsequently, the pin wires that form the apex of the U-shaped form are mechanically separated from each other and given a fan-shaped shape from the center of the hole in the root section of the frame assembly and toward the cutting edge.

After the fitting and the adjustment, the pin and the reinforcing mesh crown-root frame assembly are removed from the gypsum model, degreased, and re-installed into the gypsum model in the same sequence for the purposes of final retention of the pin.

With the use of composite rolls, the pin wires that form the apex of the U-shaped form are attached to the inner surface of the coronal section of the reinforcing mesh crown-root frame assembly. Polymerization is then performed.

Then, the process of formation of the composite lateral surface of the coronal section of the reinforcing mesh crown-root frame assembly is performed. The microhybrid composite material is shaped into a roll with the thickness of 2-3 mm with the use of the method of manual mechanical activation (MMA) according to M. L. Melikyan and is installed onto the oral and the approximal surfaces of restored precervical walls on the gypsum model. The composite roll is then mechanically pressed simultaneously against the edges of the precervical walls and against the oral and the approximal surfaces of the coronal section of the frame assembly. As a result, the composite roll takes the shape of the restored precervical walls, and a part of the composite material penetrates into the surface of the mesh frame assembly from the oral and the approximal surfaces of the frame assembly through the cells. Then the process of polymerization of the oral and the vestibular surfaces is performed.

Further, the oral and the approximal surfaces on the coronal section of the frame assembly from the precervical section to the cutting edge are formed with the use of composite rolls. Then, the occlusal preparation process is performed. Thus, the composite material is used to restore the artificial reinforcing enamel layer on the side of the oral surface. Then, the process of formation of the vestibular surface of the coronal section of the frame assembly from the precervical part to the cutting edge is implemented.

The ready metal mesh-reinforced composite (MMC) dental prosthesis is removed from the gypsum model and grinding and polishing of the composite surface of the coronal part of the dental prosthesis are performed according to the instructions after the residual polymerization shrinkage completion.

II. The Clinical Stage.

During this clinical stage, the metal mesh-reinforced composite (MMC) dental prosthesis is retained in the patient's mouth cavity. For this purpose, the temporary filling must be removed from the cavity of the tooth being restored, and the cavity must be thoroughly washed. The metal mesh-reinforced composite (MMC) dental prosthesis of the tooth being restored is fitted and, if necessary, adjusted. Then, the metal mesh-reinforced composite (MMC) dental prosthesis is degreased. In order to retain the dental prosthesis, the root cavity of the tooth being restored is filled with cement, after which the cement is applied to the mesh section of the dental prosthesis. A vibratory table is used to provide for through penetration of the cement through the mesh cells and for compaction of the cement.

The mesh-reinforced composite (MMC) dental prosthesis is installed on the vibratory table with the occlusal surface facing down. The cement is applied in small portions to the mesh root section of the prosthesis that is not covered with the composite material. Under the vibration of the operating vibratory table the cement penetrates through mesh cells and then into the inner cavity of the reinforcing coronal-root frame assembly, which is limited by the composite partition at the level of the equator of the coronal section.

Cement is also applied to the twisted part of the flexible wire pin.

The metal mesh-reinforced composite (MMC) dental prosthesis coated with cement is installed into the canal of the tooth being restored, and retention is implemented. After the retention, the excess cement is removed.

A thin layer of the composite material is applied to the connection area between the restored precervical walls of the tooth being restored and the metal mesh-reinforced composite (MMC) dental prosthesis in order to ensure tightness of the connection and the high aesthetic property of the restoration. After occlusal correction, the final grinding and polishing of the restored/reconstructed tooth are implemented.

The invention claimed is:

1. An indirect method of restoration/reconstruction of a tooth decayed/fractured below a gum line, which comprises
    forming a cavity in a root canal of the tooth,
    restoring ruined root and precervical walls of the tooth to the height of 2 to 3 mm above the gum line using a composite material,
    manufacturing a metal mesh-reinforced composite dental prosthesis, including
        manufacturing a flexible coronal-root wire pin and a mesh coronal-root frame,
        assembling the flexible coronal-root wire pin with the mesh coronal-root frame,
        forming coronal walls of the dental prosthesis by applying a composite material to the mesh coronal-root frame, and
        filling a cavity formed by the coronal walls with a composite material, and
    fixing the manufactured metal mesh-reinforced composite dental prosthesis in the cavity of the root canal.

* * * * *